US012704973B2

(12) United States Patent
Liu et al.

(10) Patent No.: US 12,704,973 B2
(45) Date of Patent: Aug. 11, 2026

(54) MEMORY SYSTEMS AND METHODS OF OPERATING THEREOF, STORAGE MEDIUMS AND ELECTRONIC APPARATUSES

(71) Applicant: Yangtze Memory Technologies Co., Ltd., Wuhan (CN)

(72) Inventors: Suyi Liu, Wuhan (CN); Lu Guo, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/784,345

(22) Filed: Jul. 25, 2024

(65) Prior Publication Data

US 2025/0328256 A1 Oct. 23, 2025

(30) Foreign Application Priority Data

Apr. 19, 2024 (CN) ......................... 202410483631.7

(51) Int. Cl.
*G06F 3/06* (2006.01)

(52) U.S. Cl.
CPC .......... *G06F 3/0619* (2013.01); *G06F 3/0647* (2013.01); *G06F 3/0653* (2013.01); *G06F 3/0679* (2013.01)

(58) Field of Classification Search
CPC .......... G06F 12/0246; G06F 1/00; G06F 3/00; G06F 5/00; G06F 2221/00; G06F 2219/00
See application file for complete search history.

(56) References Cited

U.S. PATENT DOCUMENTS

2018/0188981 A1* 7/2018 Alavi .................. G11C 16/349
2020/0133501 A1* 4/2020 Lee ...................... G06F 3/0673
2025/0094334 A1* 3/2025 Ji ......................... G06F 12/0246

* cited by examiner

*Primary Examiner* — Yong J Choe
(74) *Attorney, Agent, or Firm* — Hanley, Flight & Zimmerman, LLC

(57) ABSTRACT

Examples of the present disclosure provide memory systems and methods of operating thereof, computer-readable storage mediums and electronic apparatuses. An example memory system includes: a memory including a plurality of blocks, wherein the block includes a plurality of physical pages; and a memory controller coupled with the memory and configured to: determine a sum of the numbers of read times of physical pages adjacent to a first target physical page in a first block among the plurality of blocks; and in response to the sum of the numbers of read times being greater than or equal to a first threshold, move data stored in the first target physical page to a second block among the plurality of blocks, wherein the second block is different from the first block.

20 Claims, 4 Drawing Sheets

MEMORY SYSTEMS AND METHODS OF OPERATING THEREOF, STORAGE MEDIUMS AND ELECTRONIC APPARATUSES

CROSS-REFERENCE TO RELATED APPLICATION

The present disclosure claims the benefit of priority to China Application No. 202410483631.7, filed on Apr. 19, 2024, the content of which is incorporated herein by reference in its entirety.

TECHNICAL FIELD

Examples of the present disclosure relates to the technical field of semiconductors, and particularly to memory systems and methods of operating thereof, computer-readable storage mediums and electronic apparatuses.

BACKGROUND

In recent years, the semiconductor integrated circuit industry has developed rapidly. As the semiconductor manufacturing process continues to progress, the feature sizes of semiconductor devices continue to reduce, and the integration density of memories is also increasing. For example, the non-volatile semiconductor memory is widely applied to cellular phones, digital cameras, personal digital assistants, mobile computing apparatuses, non-mobile computing apparatuses, and various other electronic apparatuses. With the development of informatization, data volumes used by these apparatuses are also increasing rapidly, which drives a larger storage capacity and accelerate a faster access speed.

During a read operation of a memory, data information stored in a memory cell may be obtained by applying a read voltage to a selected word line and applying a pass voltage to an unselected word line.

DETAILED DESCRIPTION

Figure 1:
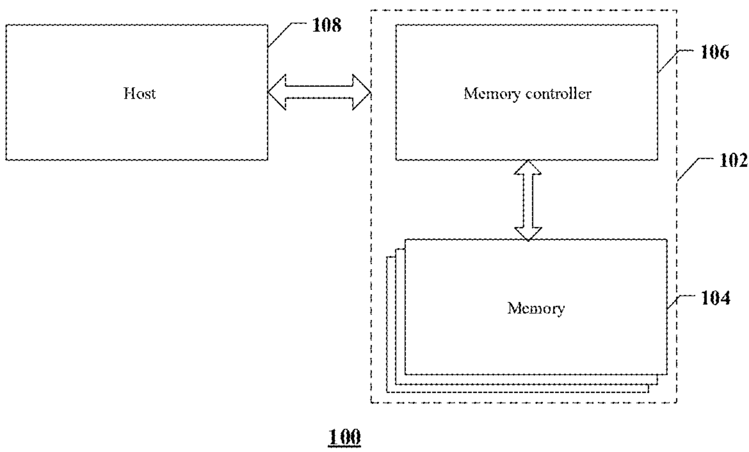
FIG. 1 is a schematic diagram of a system having a memory provided by examples of the present disclosure.

For case of understanding of the present disclosure, example implementations of the present disclosure will be described below in more detail with reference to the relevant drawings. Although the example implementations of the present disclosure are shown in the drawings, it is to be understood that the present disclosure may be implemented in various forms and should not be limited by the implementations set forth herein. Rather, these implementations are provided for a more thorough understanding of the present disclosure, and can fully convey the scope of the present disclosure to those skilled in the art.

In the following description, numerous details are presented to provide a more thorough understanding of the present disclosure. However, it is apparent to those skilled in the art that the present disclosure may be implemented without one or more of these details. In some examples, in order to avoid confusing with the present disclosure, some technical features well-known in the art are not described; that is, not all features of actual examples are described herein, and well-known functions and structures are not described in detail.

In general, terms may be understood at least in part from usage in the context. For example, the term "one or more" as used herein, depending at least in part upon the context, can be used to describe any feature, structure, or characteristic in a singular sense or can be used to describe combinations of features, structures, or characteristics in a plural sense. Similarly, terms, such as "a/an" or "the" again, can be understood to convey a singular usage or to convey a plural usage, depending at least in part upon the context. In addition, the term "based on" may be understood as not necessarily intended to convey an exclusive set of factors and may, instead, allow for existence of additional factors not necessarily expressly described, again, depending at least in part upon the context.

The terms as used herein are only intended to describe the examples, and are not used as limitations of the present disclosure, unless otherwise defined. As used herein, unless otherwise indicated expressly in the context, "a", "one" and "the" in a singular form are also intended to include a plural form. It is also to be understood that terms "composed of" and/or "comprise", while used in the specification, determine the existence of the described features, integers, steps, operations, elements and/or components, but do not exclude the existence or addition of one or more other features, integers, steps, operations, elements, components, and/or groups. As used herein, the term "and/or" includes any and all combinations of related items listed.

In order to understand the present disclosure thoroughly, detailed operations and detailed structures will be proposed in the following description to set forth the technical solution of the present disclosure. The detailed descriptions of the preferred examples of the present disclosure are as follows. However, the present disclosure may also have other implementations in addition to these detailed descriptions.

As the requirements for the performance of the memory continue to increase, the memory still has many problems when performing the read operation.

FIG. 1 shows a schematic diagram of a system 100 having a memory according to some aspects of the present disclosure. The system 100 may be a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or any other suitable electronic apparatuses having the memories therein.

As shown in FIG. 1, the system 100 may comprise a host 108 and a memory system 102, and the memory system 102 is provided with one or more memories 104 and a memory controller 106. The host 108 may be a processor of the electronic apparatus (such as a Central Processing Unit (CPU), or a System on Chip (SoC) (such as an Application Processor (AP)). The host 108 may be configured to send or receive data to or from the memory 104.

According to some implementations, the memory controller 106 is coupled to the memory 104 and the host 108, and is configured to control the memory 104. The memory controller 106 may manage data stored in the memory 104, and communicate with the host 108. In some implementations, the memory controller 106 is designed for operating in a low duty-cycle environment, such as Secure Digital (SD) memory cards, Compact Flash (CF) cards, Universal Serial Bus (USB) flash drives, or other media for use in electronic apparatuses, such as personal computers, digital cameras, mobile phones, etc. In some implementations, the memory controller 106 is designed for operating in a high duty-cycle environment of solid state drive or Embedded Multi Media Cards (eMMC) used as data memories for mobile apparatuses, such as smartphones, tablets, laptop computers, etc., and enterprise memory arrays.

The memory controller 106 may be configured to control operations of the memory 104, such as read, erase, and write (also referred to as program) operations. The memory controller 106 may further be configured to manage various functions with respect to data stored or to be stored in the memory 104, including, but not limited to, bad-block management, garbage collection, logical-to-physical address translation, wear leveling, etc. In some implementations, the memory controller 106 is further configured to process Error Correction Codes (ECC) with respect to the data read from or written to the memory 104. The memory controller 106 may further perform any other suitable functions, for example, formatting the memory 104. The memory controller 106 may communicate with a host (e.g., the host 108) according to a communication protocol. For example, the memory controller 106 may communicate with the host 108 through at least one of various interface protocols, such as a USB protocol, an MMC protocol, a Peripheral Component Interconnect (PCI) protocol, a Peripheral Component Interconnect Express (PCIE) protocol, an Advanced Technology Attachment (ATA) protocol, a serial-ATA protocol, a parallel-ATA protocol, a Small Computer System Interface (SCSI) protocol, an Enhanced Small Disk Interface (ESDI) protocol, an Integrated Drive Electronics (IDE) protocol, a Firewire protocol, etc.

Figure 2A:
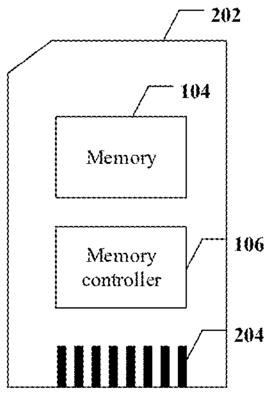
FIG. 2A is a schematic diagram of a memory card provided by examples of the present disclosure.
Figure 2B:
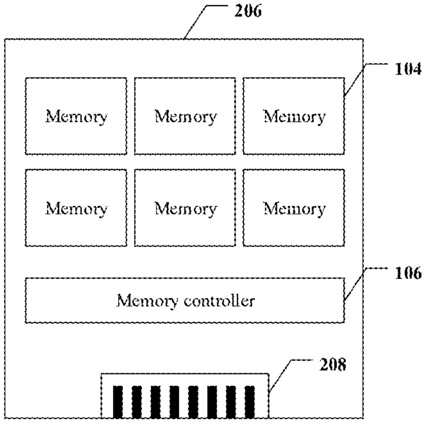
FIG. 2B is a schematic diagram of a Solid State Drive (SSD) provided by examples of the present disclosure.

The memory controller 106 and the one or more memories 104 may be integrated into various types of memory apparatuses, for example, be comprised in the same package (such as a universal flash storage package or an eMMC package). That is to say, the memory system 102 may be implemented and packaged into different types of end electronic products. In one example shown in FIG. 2A, the memory controller 106 and the single memory 104 may be integrated into a memory card 202. The memory card 202 may comprise a Personal Computer Memory Card International Association (PC) card, a CF card, a Smart Media (SM) card, a memory stick, a Multi Media Card (MMC), a Reduced-Size MMC (RS-MMC), a Multi Media Card Micro (MMC micro), an SD card (SD, miniSD, microSD, SDHC), Universal Flash Storage (UFS), etc. The memory card 202 may further comprise a memory card connector 204 coupling the memory card 202 with a host (e.g., the host 108 in FIG. 1). In another example as shown in FIG. 2B, the memory controller 106 and the plurality of memory 104 may be integrated into an SSD 206. The SSD 206 may further comprise an SSD connector 208 coupling the SSD 206 with the host (e.g., the host 108 in FIG. 1). In some implementations, at least one of a storage capacity or an operation speed of the SSD 206 is greater than at least one of a storage capacity and/or an operation speed of the memory card 202.

In the examples of the present disclosure, the memory may be a NAND flash. However, it is to be understood that, the solutions or technologies of the present disclosure are not limited to be applied to the NAND flash, and may be applied to other types of memory devices, such as an Electrically Erasable Programmable Read-Only Memory (EEPROM), a NOR flash, a Phase Change Random Access Memory (PRAM), a magnetic RAM (MRAM), a resistive RAM (RRAM), a ferroelectric RAM (FRAM), etc.

In the examples of the present disclosure, each of memory dies may comprise one or more memory cell arrays. One type of memory cells such as a Single-Level Cell (SLC) may store one bit per cell. Other types of memory cells, such as a Multi-Level Cell (MLC), a Trinary-Level Cell (TLC), a Quad-Level Cell (QLC), and a Penta-Level Cell (PLC), may store a plurality of bits per cell. In some examples, each of the memories may comprise one or more memory cell arrays, for example, any combination of an SLC array, an MLC array, a TLC array, a QLC array, or such memory cell arrays.

Figure 3:
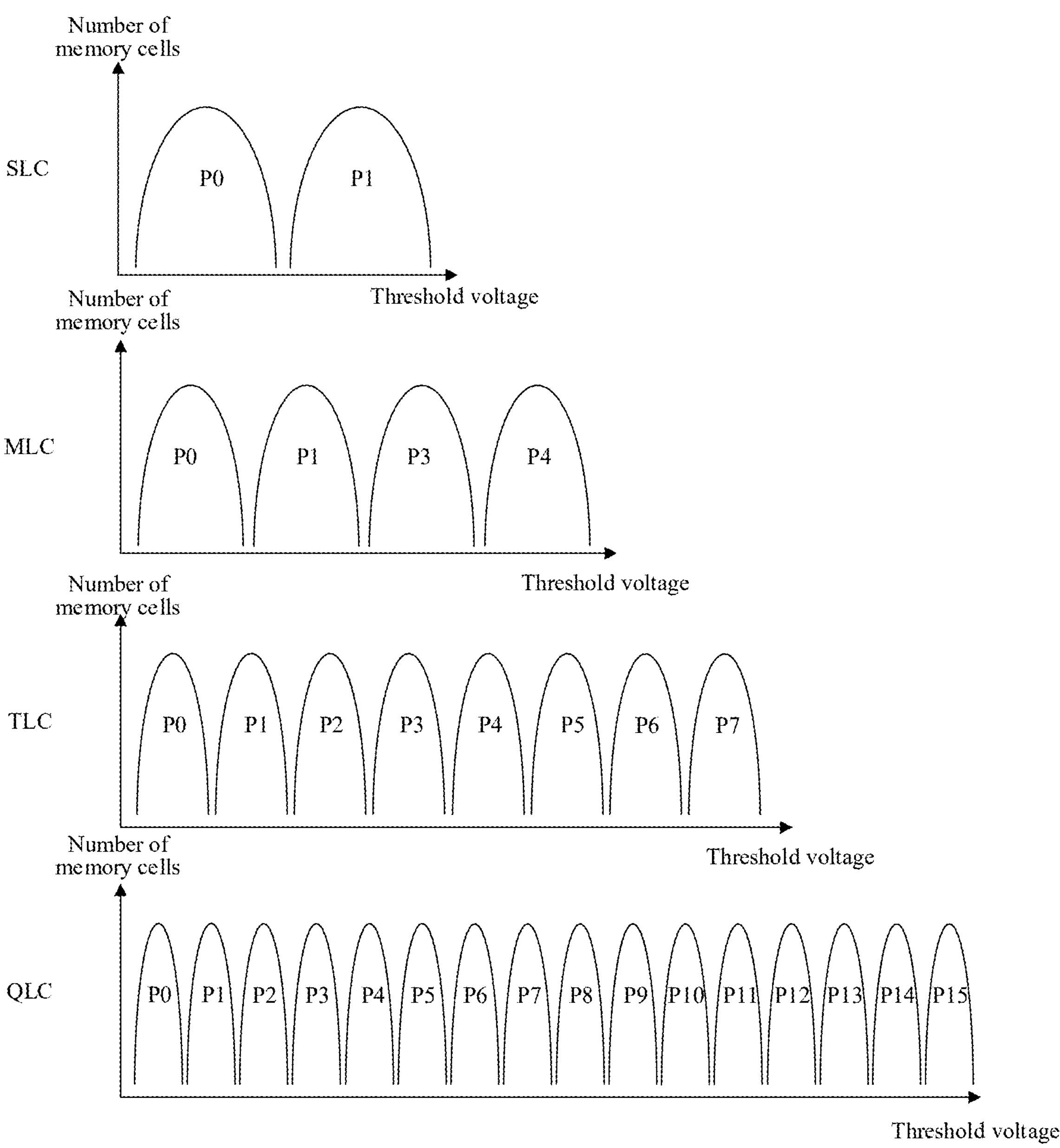
FIG. 3 is a schematic diagram of a threshold voltage distribution state of different levels of memory cells provided by examples of the present disclosure.

In some examples, as shown in FIG. 3, the SLC may correspond to two threshold voltage distributions, which are P0 and P1, wherein the threshold voltage distribution P0 corresponds to an erased data state; and the threshold voltage distribution P1 corresponds to a programmed data state. A threshold voltage of the erased data state corresponding to the threshold voltage distribution P0 is less than a threshold voltage of the programmed data state corresponding to the threshold voltage distribution P1. Therefore, a memory cell having the threshold voltage in the threshold voltage distribution P0 is in the erased data state; and a memory cell having the threshold voltage in the threshold voltage distribution P1 is in the programmed data state. In some implementations, the SLC-type memory cell stores 1-bit data.

The MLC corresponds to four threshold voltage distributions, which are P0, P1, P2, and P3, and threshold voltages increase sequentially. Likewise, the threshold voltage distribution P0 corresponds to the erased data state, and the threshold voltage distributions P1, P2, and P3 correspond to programmed states. In some implementations, the MLC-type memory cell stores 2-bit data.

The TLC corresponds to eight threshold voltage distributions, which are P0, P1, P2, P3, P4, P5, P6, and P7, and threshold voltages increase sequentially. Similarly, the threshold voltage distribution P0 corresponds to the erased data state, and the threshold voltage distributions P1, P2, P3, P4, P5, P6, and P7 correspond to the programmed data state. In some implementations, the TLC-type memory cell stores 3-bit data.

The QLC corresponds to sixteen threshold voltage distributions, which are P0, P1, P2, P3, P4, P5, P6, P7, P8, P9, P10, P11, P12, P13, P14, and P15, and threshold voltages increase sequentially. Similarly, the threshold voltage distribution P0 corresponds to the erased data state, and the threshold voltage distributions P1, P2, P3, P4, P5, P6, P7, P8, P9, P10, P11, P12, P13, P14, and P15 correspond to the programmed data state. In some implementations, the QLC-type memory cell stores 4-bit data. In an example, the 4-bit data stored by the memory cell in the QLC memory respectively corresponds to data of 4 logical pages, i.e. Lower Page (LP) data, Middle Page (MP) data, Upper Page (UP) data, and Extra Page (XP) data.

Figure 4:
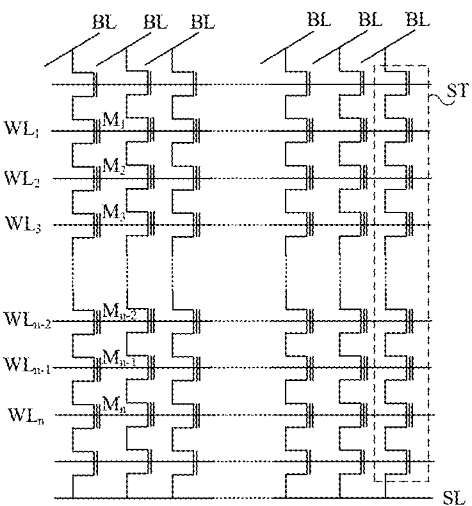
FIG. 4 is a schematic diagram of physical pages corresponding to a plurality of word lines in a block provided by examples of the present disclosure.

In some examples, the memory may comprise a plurality of blocks. As shown in FIG. 4, one block may comprise a plurality of strings (STs); a first end of each memory cell string ST is connected to a Bit Line (BL), and a second end is connected to a Source Line (SL); gates of the plurality of memory cells $M_1$ to $M_n$ on the memory cell string ST are respectively coupled to word lines $WL_1$ to $WL_n$; and all the memory cells coupled with one word line here may constitute one physical page in the block. When the memory controller performs a read operation on the memory, a read voltage $V_{read}$ is applied to a selected word line, and a pass voltage $V_{pass}$ is applied to an unselected word line; and a magnitude of a threshold voltage $V_t$ of a selected memory cell may be determined by sensing a current on a selected bit line, so as to acquire data information stored in the selected memory cell. It is to be noted that, the pass voltage $V_{pass}$ here is greater than the read voltage $V_{read}$, and each read operation only selects one word line (i.e. read by page), that is to say, the read voltage $V_{read}$ is applied to one selected word line in each read operation, and the pass voltage $V_{pass}$ is applied to all other unselected word lines. Therefore, a large pass voltage $V_{pass}$ may cause slight programming (also referred to as soft programming) to the memory cells coupled with the unselected word lines; and after the plurality of read operations, the impact accumulated by the slight programming may cause an offset (e.g. right offset) in the threshold voltage distribution of the memory cells in the block, and ultimately leads to read errors, and such phenomenon is referred to as Read Disturbance (RD). When the plurality of read operations all target a same selected word line (physical page), the memory cells coupled with at least one unselected word line adjacent to the selected word line are subjected to larger read disturbance, leading to a significant increase in Fail Bit Counts (FBCs) of the read operations, and thus resulting in reduction in the reliability of the memory, and such phenomenon is referred to as Single Page Read Disturbance (SPRD). It can be understood that, the single page read disturbance may refer to read disturbance caused by the plurality of read operations targeting the same physical page. In an example, the memory controller may receive a read request comprising a logical address from outside the memory system (e.g. a host), and a physical address of each physical page in the memory may correspond to one or more logical addresses, such that, when the logical addresses involved in the plurality of read requests received by the memory controller are all mapped to the same physical address, the plurality of read operations are repeatedly performed on one corresponding physical page (one word line) in the memory, thus leading to the occurrence of the single page read disturbance phenomenon. In some examples, the impact caused by the accumulation of slight programming in the plurality of read operations may be relieved by appropriately reducing the pass voltage $V_{pass}$ applied to the unselected word line. However, this method cannot solve the problem of read disturbance fundamentally.

Figure 5:
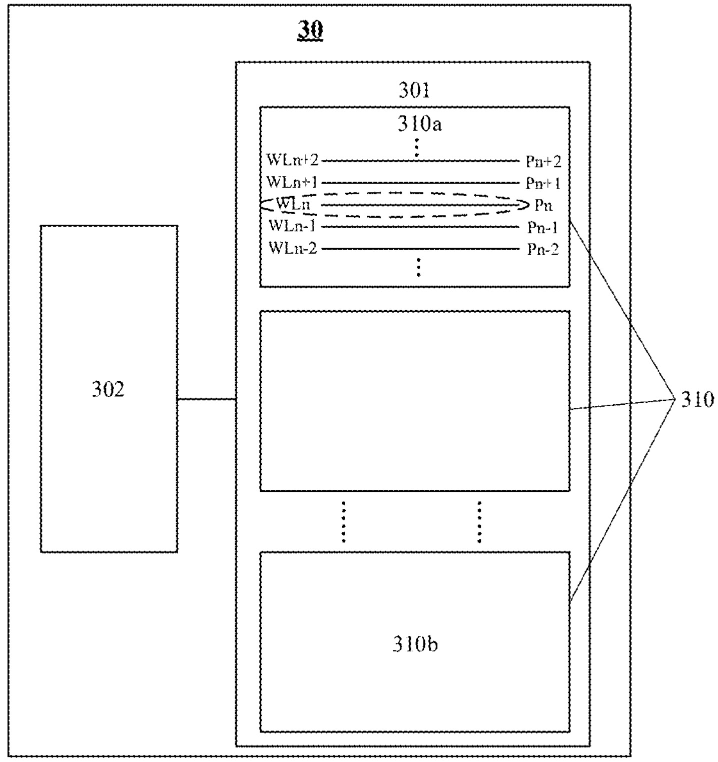
FIG. 5 is a schematic diagram of a memory system provided by examples of the present disclosure.

As shown in FIG. 5, the present disclosure provides a memory system 30, comprising: a memory 301 comprising a plurality of blocks 310, wherein the block 310 comprises a plurality of physical pages; and a memory controller 302 coupled with the memory 301 and configured to: determine a sum of the numbers of read times of physical pages adjacent to a first target physical page $P_n$ in a first block 310*a* among the plurality of blocks 310; and in response to the sum of the numbers of read times being greater than or equal to a first threshold, move data stored in the first target physical page $P_n$ to a second block 310*b* among the plurality of blocks 310, wherein the second block 310*b* is different from the first block 310*a*.

In the examples of the present disclosure, the memory system 30 comprises the memory 301 and the memory controller 302 coupled with the memory 301. The memory 301 may comprise the plurality of blocks 310, each block 310 may comprise the plurality of physical pages corresponding to the plurality of word lines one by one, and each physical page comprises all memory cells coupled with one corresponding word line. The memory 301 may be a NAND flash, an electrically erasable programmable read-only memory, a NOR flash, a phase change random access memory, a magnetic RAM, a resistive RAM, a ferroelectric RAM, etc. Here, description is performed by using an example that the memory 301 is the NAND flash. The memory controller 302 may be implemented by using hardware (e.g., a logical circuit), software, firmware, or a combination of the hardware, software, and firmware. An example of the logical circuit comprises a dedicated hard-wired logical circuit (e.g., one or more state machine logical circuits), a programmable logical circuit (e.g., a field-programmable gate array (FPGA) and a programmable logic array (PLA)), etc. In some examples, the logical circuit of the memory controller 302 is designed to perform some forms of program codes, for example, memory firmware (such as an embedded processor, an embedded controller, etc.)

The memory controller 302 may determine the sum of the numbers of read times of the physical pages adjacent to the first target physical page $P_n$ in the first block 310*a* by means of counting the number of read operations performed on various physical pages, or analyzing a physical address corresponding to a read command received from an external apparatus (e.g., the host), etc. It can be understood that, if the first target physical page $P_n$ corresponds to the first one or the last one among the word lines in the first block 310*a*, there may be only one physical page adjacent to the first target physical page $P_n$; and if the first target physical page $P_n$ corresponds to a word line in a middle portion of the first block 310*a*, i.e., corresponding to a word line other than the first one or the last one among the word lines, there may be two physical pages ($P_{n+1}$ and $P_{n-1}$) adjacent to the first target physical page $P_n$.

The memory controller 302 may further move the data stored in the first target physical page $P_n$ to the second block 310*b* in response to the sum of the numbers of read times of the physical pages adjacent to the first target physical page $P_n$ being greater than or equal to the first threshold, and herein, the second block 310*b* and the first block 310*a* are two different blocks. That is to say, in order to prevent or reduce read errors ultimately caused by the slight programming to the memory cells coupled with the word line $WL_n$ due to the accumulation of repeated reading of the memory cells coupled with the adjacent word lines (e.g., $WL_{n+1}$ and $WL_{n-1}$), one first threshold that is used for indicating an upper limit of a total number of read disturbances to which the memory cells in the first target physical page $P_n$ are subjected may be set. If the sum of the numbers of read times of the physical pages adjacent to the first target physical page $P_n$ is greater than or equal to the first threshold, data movement may be triggered, i.e., the memory controller 302 moves the data stored in the first target physical page $P_n$ to other open blocks (e.g., the second block 310*b*), and the open block here means that only part of the physical pages in the block is written with data, and the remaining physical pages are not written with data. It is to be noted that, the first threshold may be determined according to an actual test result of a memory product, or is provided with a reference numerical value by a designer. In the present disclosure, the memory controller 302 moves the data stored in the first target physical page $P_n$ to the second block 310*b*, which may be implemented by first reading the data stored in the first target physical page $P_n$, and then writing the read data to the second block 310*b*. That is to say, in a "data movement" process in the present disclosure, the data stored in the first target physical page $P_n$ may not be erased for the moment, and after "data movement" is completed, the data stored in the first target physical page $P_n$ becomes invalid data, such that the memory controller 302 may erase the invalid data stored in the first target physical page $P_n$ in subsequent operations (e.g., a garbage collection operation).

Therefore, the memory controller 302 may reduce disturbance caused by the plurality of repeated read times of the adjacent physical pages to the first target physical page $P_n$, thereby mitigating the phenomenon of threshold voltage offsets, reducing the count of error bits for reading the first target physical page $P_n$, and thus improving the reliability of the memory.

In some examples, the number of bits of a memory cell in the second block 310*b* is less than the number of bits of a memory cell in the first block 310*a*.

In the examples of the present disclosure, the performance of the memory cell in terms of read disturbance resistance, read speeds, data retention capabilities, and the like decreases as the number of memory cell levels increases, that is to say, the performance of the SLC, the MLC, the TLC, and the QLC sequentially decreases in sequence. Therefore, the number of bits (i.e., the number of levels) of the memory cell in the second block 310*b* may be less than the number of bits (i.e., the number of levels) of the memory cell in the first block 310*a*, that is to say, when the sum of the numbers of read times of the physical pages adjacent to the first target physical page $P_n$ is greater than or equal to the first threshold, the data stored in the first target physical page $P_n$ may be moved to the second block 310*b* with better read disturbance resistance, read speed, and data retention capability, such that the problem of frequent read retry caused by read errors is reduced, thereby reducing the refresh frequency of the block, improving the performance of the memory system during the subsequent read operations, and improving the data reliability of the memory system in some complex usage scenarios. In an example, if the memory cells in the first block 310*a* are the QLC, the memory cells in the second block 310*b* may be the TLC, the MLC, or the SLC; if the memory cells in the first block 310*a* are the TLC, the memory cells in the second block 310*b* may be the MLC or the SLC; and if the memory cells in the first block 310*a* are the MLC, the memory cells in the second block 310*b* may be the SLC.

In some examples, the first block 310*a* comprises a two-level cell, a three-level cell, or a four-level cell; and the second block 310*b* comprises a single-level cell.

In the examples of the present disclosure, each block 310 in the memory 301 may comprise one level type of memory cells (e.g., one type of cells among the SLC, the MLC, the TLC, or the QLC). In an example, the first block 310*a* may be a block constituted by the MLC, the TLC, or the QLC, and the second block 310*b* may be a block constituted by the SLC. Since the read disturbance resistance of the SLC is stronger than the read disturbance resistance of the MLC, the TLC, the QLC and the like, the SLC can withstand more number of times of single page read disturbance, and after the data stored in the first target physical page $P_n$ in the first block 310*a* is moved to the second block 310*b*, the problem of frequent read retry caused by the read errors can be effectively reduced, and the refresh frequency of the block can be reduced as well. Moreover, since the read speed of the SLC is faster than the read speeds of the MLC, the TLC, the QLC and the like, after the data stored in the first target physical page $P_n$ in the first block 310*a* is moved to the second block 310*b*, the performance of the memory system subsequently performing the read operation on data stored in an original first target physical page $P_n$ can be improved. Furthermore, since the SLC has a better data retention capability compared to that of the MLC, the TLC, the QLC and the like, after the data stored in the first target physical page $P_n$ in the first block 310*a* is moved to the second block 310*b*, the data reliability of the memory system in some complex usage scenarios can also be improved.

In some examples, the memory controller 302 is configured to: count the number of read times of the physical pages adjacent to the first target physical page $P_n$ to determine the sum of the numbers of read times.

In the examples of the present disclosure, the memory controller 302 may comprise a processor. The processor here includes, but is not limited to, a Central Processing Unit (CPU), a field-programmable gate array, a programmable logic array, an Application Specific Integrated Circuit (ASIC), etc. The processor in the memory controller 302 may count the number of read times of the physical pages adjacent to the first target physical page $P_n$ by utilizing a self hardware logical circuit or by running an executable program (e.g., firmware), so as to determine the sum of the numbers of read times of the physical pages adjacent to the first target physical page $P_n$. It is to be noted that, the processor in the memory controller 302 may count the number of read times of all the physical pages in the first block 310*a*, and determine the sum of the numbers of read times of the physical pages adjacent to each physical page, respectively. It can be understood that, if the first target physical page $P_n$ is the first one among the physical pages in the first block 310*a*, the processor in the memory controller 302 may count the number of read times of the second one among the physical pages as the sum of the numbers of read times; if the first target physical page $P_n$ is the last one among the physical pages in the first block 310*a*, the processor in the memory controller 302 may count the number of read times of the penultimate one among the physical pages as the sum of the numbers of read times; and if the first target physical page $P_n$ is the physical page (e.g., $P_n$) in the middle portion of the first block 310*a*, the processor in the memory controller 302 may count the number of read times of the physical pages $P_{n+1}$ and $P_{n-1}$, and take a sum of the two as the sum of the numbers of read times.

In some examples, in order to determine the impact of read disturbance on the first target physical page $P_n$ more accurately, the memory controller 302 may also determine a sum of the numbers of read times of the physical pages $P_{n+2}$, $P_{n+1}$, $P_{n-1}$, and $P_{n-2}$, and when the sum of the number of read times of the physical pages $P_{n+2}$, $P_{n+1}$, $P_{n-1}$, and $P_{n-2}$ is greater than or equal to a preset threshold, move the data stored in the first target physical page $P_n$ to the second block 310*b* with better read disturbance resistance, read speed, and data retention capability. That is to say, the memory controller 302 may also count the number of read times of all the physical pages close to the first target physical page $P_n$ within a certain range, such that whether the read disturbance to which the first target physical page $P_n$ is subjected reaches an upper limit is evaluated more accurately. It can be understood that, compared to the physical pages $P_{n+1}$ and $P_{n-1}$, the physical pages $P_{n+2}$ and $P_{n-2}$ have less impact of read disturbance on the first target physical page $P_n$, such that when the memory controller 302 determines the sum of the numbers of read times, a coefficient less than 1 may be multiplied on the basis of the number of read times of the physical pages $P_{n+2}$ and $P_{n-2}$, so as to accurately measure the impact of the plurality of physical pages close to the first target physical page $P_n$. In an example, the sum X of the number of read times may be determined by the following formula:

$$X=X_{n+1}+X_{n-1}+\mu(X_{n+2}+X_{n-2})$$

X is the sum of the numbers of read times; $X_{n+1}$, $X_{n-1}$, $X_{n+2}$, and $X_{n-2}$ respectively are the number of read times of the physical pages $P_{n+1}$, $P_{n-1}$, $P_{n+2}$, and $P_{n-2}$; and $\mu$ is an impact coefficient and is less than 1. In some examples, the memory controller 302 may also determine the number of read times of the physical pages $P_{n+3}$ and $P_{n-3}$, and determine the sum of the numbers of read times based on the number of read times of the physical pages $P_{n+1}$, $P_{n-1}$, $P_{n+2}$, $P_{n-2}$, $P_{n+3}$, and $P_{n-3}$, such that whether the read disturbance to which the first target physical page $P_n$ is subjected reaches the upper limit is evaluated more accurately. It is to be noted that, X here may not be an integer; and X is only used for measuring a degree of read disturbance to which the first target physical page $P_n$ is subjected, and does not represent a sum of the numbers of read times of a plurality of actual adjacent physical pages.

In some examples, the memory controller 302 is configured to: in response to a read request comprising a logical address, determine a physical address corresponding to the logical address, wherein the physical address comprises physical addresses of the physical pages adjacent to the first target physical page; and in response to the physical address, read the physical pages adjacent to the first target physical page, and count the number of read times of the physical pages adjacent to the first target physical page.

In the examples of the present disclosure, the memory controller 302 may determine the physical address corresponding to the logical address in response to the read request comprising the logical address from outside of the memory system 30 (e.g., the host). In an example, the memory controller 302 may comprise a Flash Translation Layer (FTL); the flash translation layer may be configured to translate the logical address received by the memory controller 302 to the corresponding physical address based on logical address to physical address mapping; and the flash translation layer may be implemented by performing respective firmware algorithms by a hardware circuit of the memory controller 302. Herein, the physical address determined by the memory controller 302 according to the logical address in the read request may comprise a physical address of at least one physical page adjacent to the first target physical page (i.e., the physical address corresponding to one or two physical pages adjacent to the first target physical page). Next, the memory controller 302 may read the physical pages corresponding to these physical addresses in response to the physical addresses obtained from logical address translation, i.e., reading the at least one physical page adjacent to the first target physical page, and count the number of read times of the at least one physical page adjacent to the first target physical page. That is to say, herein, the plurality of physical addresses corresponding to the plurality of logical addresses in the read request may hit one or two physical pages (e.g., at least one of the physical pages $P_{n+1}$ or $P_{n-1}$) adjacent to the first target physical page $P_n$. Regardless of hitting adjacent one or two physical pages, the memory controller 302 counts the number of read times of the respective physical pages.

Figure 6:
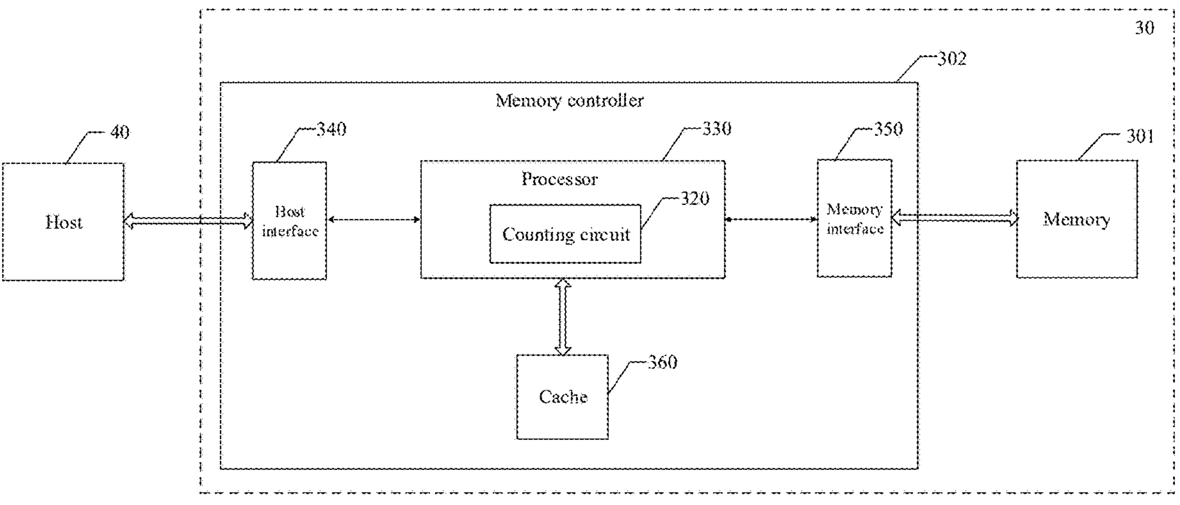
FIG. 6 is a schematic diagram of a counting circuit in a memory controller provided by examples of the present disclosure.

In some examples, as shown in FIG. 6, the memory controller 302 comprises a counting circuit. The counting circuit is configured to: count the number of read times of the physical pages adjacent to the first target physical page to determine the sum of the numbers of read times.

In the examples of the present disclosure, the processor 330 in the memory controller 302 may be coupled to the host 40 through a host interface 340, and the processor 330 may also be coupled to the memory 301 through a memory interface 350. The memory controller 302 further comprises a cache 360 coupled to the processor 330, wherein the cache 360 may be configured to cache part of a Logical address To Physical address (L2P) mapping table, executable instructions, etc. The memory controller 302 may further comprise the counting circuit 320, wherein the counting circuit 320 here may be part of a logical circuit in the processor 330 of the memory controller 302; and the counting circuit 320 may be composed of a series of triggers and logic gate circuits. The counting circuit 320 may count the number of read times of the physical pages adjacent to the first target physical page to determine the sum of the numbers of read times.

In some examples, the counting circuit may also be other logical circuits located outside the processor 330 in the memory controller 302. In some other examples, the memory controller 302 may implement the counting of the number of read times of various physical pages through performing firmware.

In some examples, the memory controller 302 is configured to: within a preset time cycle, count the number of read times of the physical pages adjacent to the first target physical page to determine the sum of the numbers of read times.

In the examples of the present disclosure, the memory controller 302 may, within the preset time cycle, count the number of read times of the physical pages adjacent to the first target physical page to determine the sum of the numbers of read times. The preset time cycle here may be determined according to an actual test result of a memory product, or be provided with a reference numerical value by a designer. The preset time cycle may also be a refresh cycle of the first block. Therefore, the memory controller 302 may, within the preset time cycle, in response to the adjacent physical pages frequently read, move the data stored in the first target physical page subjected to read disturbance, so as to mitigate the phenomenon of threshold voltage offsets, to reduce the count of error bits for reading the first target physical page, and thereby improving the reliability of the memory.

It is to be noted that, in the present disclosure, a magnitude of a cycle threshold may also be set based on a duration of the preset time cycle, and the cycle threshold is less than the above first threshold. The memory controller 302 may also move the data stored in the first target physical page to the second block in response to the sum of the numbers of read times of the physical pages adjacent to the first target physical page within the preset time cycle being greater than or equal to the cycle threshold. Therefore, the memory controller 302 may solve the problem of read errors in the first target physical page caused by the repeated reading of the adjacent physical pages in advance.

In some examples, the memory controller 302 may also determine the physical address corresponding to the logical address in response to the read request comprising the logical address, and increase the number of read times of the corresponding physical page directly according to the physical address instead of increasing the number of read times after completing the read operation on the physical page. Therefore, the working efficiency of the memory controller may be further improved.

In some examples, a different first target physical page in the first block corresponds to a different first threshold.

In the examples of the present disclosure, due to the impact of manufacturing process or external environment factors, each physical page may have different physical characteristics, such that the read disturbance resistance of each physical page may also be different. Therefore, different first thresholds may be set to different first target physical pages in the first block, so as to evaluate, more accurately, whether read disturbance to which different first target physical pages are subjected reaches the upper limit.

In some examples, the memory controller 302 is further configured to: determine the number of read times of a second target physical page in the first block 310*a*; and in response to the number of read times of the second target physical page being greater than or equal to a second threshold, move data stored in the second target physical page to the second block 310*b*, wherein the second threshold is less than or equal to the first threshold.

In the examples of the present disclosure, the memory controller 302 may also move the data stored in the second target physical page to the second block 310*b* in response to the number of read times of the second target physical page being greater than or equal to the second threshold. That is to say, a number-of-read-time threshold (i.e., the second threshold) may also be set for the physical page (i.e., the second target physical page) of a source generating read disturbance, and data of the physical page of the source generating read disturbance due to frequent reading is moved, such that the physical page is prevented from being continuously repeatedly read and from the generated read disturbance to the adjacent physical pages. It can be understood that, since the read disturbance to which any one of the physical pages (the second target physical page) is subjected is derived from the adjacent one or two physical pages, the second threshold may be less than or equal to the first threshold. For example, for the physical page (the second target physical page) corresponding to the first or last one among word lines in a block, the second threshold may be equal to the first threshold; and for the physical pages (the second target physical pages) corresponding to a word line other than the first or last one among the word lines in the block, the second threshold may be less than the first threshold.

In some examples, the memory controller 302 is further configured to: decide whether the reading operation for the second target physical page is single logical page read; and in response to the reading operation for the second target physical page being the single logical page read and the number of read times of the second target physical page being greater than or equal to the second threshold, move the data stored in the second target physical page to the second block.

In the examples of the present disclosure, the memory controller 302 may also decide whether the plurality of read operations for the second target physical page is the single logical page read based on the plurality of read requests comprising the logical addresses from outside the memory system 30 (e.g., the host). When the reading operation for the second target physical page is the single logical page read and the number of read times of the second target physical page is greater than or equal to the second threshold, the memory controller 302 may move the data stored in the second target physical page to the second block 310*b*. Therefore, read errors of the memory system 30 in a single page read disturbance scenario may be reduced to improve the reliability of the memory system 30.

In some examples, the memory controller 302 is further configured to: in response to the data moving to the second block, update a logical address to physical address mapping table.

In the examples of the present disclosure, the memory controller 302 may utilize the flash translation layer to update the logical address to physical address mapping table after moving the data stored in at least one of the first target physical page or the second target physical page to the second block 310*b*, so as to update an L2P mapping relationship of data originally stored in at least one of the first target physical page or the second target physical page.

Figure 7:
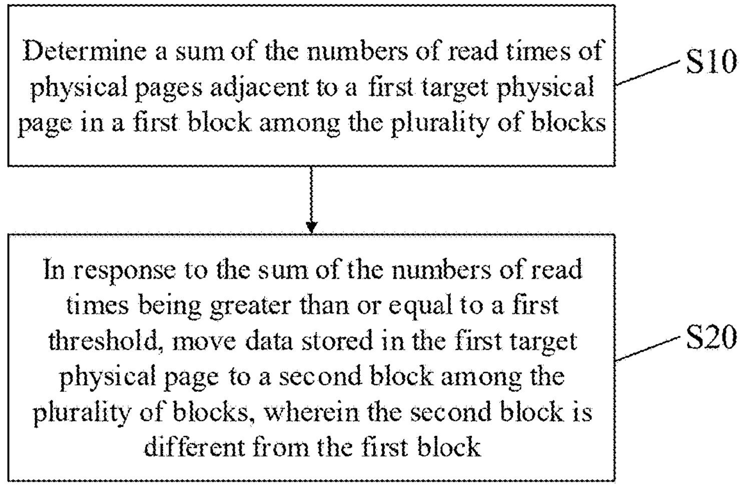
FIG. 7 is a flow diagram of operations of a method of operating a memory system provided by examples of the present disclosure.

As shown in FIG. 7, the present disclosure provides a method of operating a memory system. The memory system comprises a memory and a memory controller coupled with the memory. The memory comprises a plurality of blocks, and the block comprises a plurality of physical pages. The method comprises the following operations:

operation S10, determining a sum of the numbers of read times of physical pages adjacent to a first target physical page in a first block among the plurality of blocks; and operation S20, in response to the sum of the numbers of read times being greater than or equal to a first threshold, moving data stored in the first target physical page to a second block among the plurality of blocks, wherein the second block is different from the first block.

It is to be understood that the operations shown in FIG. 7 are not exclusive, and other operations may also be performed before, after, or between any of the shown operations.

In the examples of the present disclosure, referring to FIG. 5, the sum of the numbers of read times of the physical pages adjacent to the first target physical page $P_n$ in the first block may be determined by means of counting the number of read operations performed on various physical pages, or analyzing a physical address corresponding to a read command received from an external apparatus (e.g., the host), etc. It can be understood that, if the first target physical page $P_n$ corresponds to the first one or the last one among the word lines in the first block, there may be only one physical page adjacent to the first target physical page $P_n$; and if the first target physical page $P_n$ corresponds to a word line in a middle portion of the first block, i.e., corresponding to a word line other than the first one or the last one among the word lines, there may be two physical pages ($P_{n+1}$ and $P_{n-1}$) adjacent to the first target physical page $P_n$.

Next, the data stored in the first target physical page $P_n$ may be moved to the second block in response to the sum of the numbers of read times of the physical pages adjacent to the first target physical page $P_n$ being greater than or equal to the first threshold. Here, the second block and the first block are two different blocks. That is to say, in order to prevent or reduce read errors ultimately caused by the slight programming to the memory cells coupled with the word line $WL_n$ due to the accumulation of repeated reading of the memory cells coupled with the adjacent word lines (e.g., $WL_{n+1}$ and $WL_{n-1}$), one first threshold that is used for indicating an upper limit of a total number of read disturbances to which the memory cells in the first target physical page are subjected may be set. If the sum of the numbers of read times of the physical pages adjacent to the first target physical page is greater than or equal to the first threshold, data movement may be triggered, i.e., the data stored in the first target physical page is moved to other open blocks (e.g., the second block), and the open block here means that only part of the physical pages in the block is written with data, and the remaining physical pages are not written with data. It is to be noted that, the first threshold may be determined according to an actual test result of a memory product, or is provided with a reference numerical value by a designer.

Therefore, disturbance caused by the plurality of repeated read times of the adjacent physical pages to the first target physical page may be reduced, thereby mitigating the phenomenon of threshold voltage offsets, reducing the count of error bits for reading the first target physical page, and thus improving the reliability of the memory.

In some examples, the determining the sum of the numbers of read times of the physical pages adjacent to the first target physical page in the first block among the plurality of blocks comprises: counting the number of read times of the physical pages adjacent to the first target physical page to determine the sum of the numbers of read times.

In some examples, the method further comprises: in response to a read request comprising a logical address, determining a physical address corresponding to the logical address, wherein the physical address comprises physical addresses of the physical pages adjacent to the first target physical page; and in response to the physical address, reading the physical pages adjacent to the first target physical page. The counting the number of read times of the physical pages adjacent to the first target physical page comprises: in response to reading the physical pages adjacent to the first target physical page, counting the number of read times of the physical pages adjacent to the first target physical page.

In some examples, a different first target physical page in the first block corresponds to a different first threshold.

In some examples, the method further comprises: determining the number of read times of a second target physical page in the first block; and in response to the number of read times of the second target physical page being greater than or equal to a second threshold, moving data stored in the second target physical page to the second block, wherein the second threshold is less than or equal to the first threshold.

In some examples, the method further comprises: judging whether the reading operation for the second target physical page is single logical page read. In response to the number of read times of the second target physical page being greater than or equal to the second threshold, moving the data stored in the second target physical page to the second block comprises: in response to the reading operation for the second target physical page being the single logical page read and the number of read times of the second target physical page being greater than or equal to the second threshold, moving the data stored in the second target physical page to the second block.

In some examples, the method further comprises: determining the second threshold according to a reference threshold of the number of read times of a single physical page in the memory, wherein the second threshold is ⅕ to ⅓ of the reference threshold.

In the examples of the present disclosure, the second threshold may be determined according to the reference threshold of the number of read times of the single physical page. The reference threshold here may be determined according to an actual test result of a memory product, or be provided with a reference numerical value (e.g., a read threshold specified by a specification in case the NAND is in a single page read disturbance scenario) by a designer, a manufacturer, and an industry standard. In an example, the second threshold may be ⅕ to ⅓ of the reference threshold.

In some examples, the method further comprises: in response to the data moving to the second block, updating a logical address to physical address mapping table.

The present disclosure provides a computer-readable storage medium. The computer-readable storage medium stores executable instructions. The executable instructions, when being performed, implements the method as described in any one of the above-mentioned examples. In an example, the executable instructions may be stored in a memory 301 or a cache of a memory controller 302, and may be performed by a processor in the memory controller. The executable instructions may also be referred to as firmware.

The present disclosure provides an electronic apparatus, comprising the memory system as described in any one of the above-mentioned examples.

In the examples of the present disclosure, the electronic apparatus may be understood by correspondingly referring to the system 100 in the example shown in FIG. 1, and is not described herein in details.

The present disclosure provides memory systems and methods of operating thereof, computer-readable storage mediums and electronic apparatuses.

In a first aspect, the present disclosure provides a memory system, comprising:

- a memory comprising a plurality of blocks, wherein the block comprises a plurality of physical pages; and
- a memory controller coupled with the memory and configured to:
- determine a sum of the numbers of read times of physical pages adjacent to a first target physical page in a first block among the plurality of blocks; and
- in response to the sum of the numbers of read times being greater than or equal to a first threshold, move data stored in the first target physical page to a second block among the plurality of blocks, wherein the second block is different from the first block.

In some examples, the memory controller is configured to:

- count the number of read times of the physical pages adjacent to the first target physical page to determine the sum of the numbers of read times.

In some examples, the memory controller is configured to:

- in response to a read request comprising a logical address, determine a physical address corresponding to the logical address, wherein the physical address comprises physical addresses of the physical pages adjacent to the first target physical page; and
- in response to the physical address, read the physical pages adjacent to the first target physical page, and count the number of read times of the physical pages adjacent to the first target physical page.

In some examples, the memory controller comprises a counting circuit, and the counting circuit is configured to:

- count the number of read times of the physical pages adjacent to the first target physical page to determine the sum of the numbers of read times.

In some examples, the memory controller is configured to:

- within a preset time cycle, count the number of read times of the physical pages adjacent to the first target physical page to determine the sum of the numbers of read times.

In some examples, a different first target physical page in the first block corresponds to a different first threshold.

In some examples, the memory controller is further configured to:

determine the number of read times of a second target physical page in the first block; and in response to the number of read times of the second target physical page being greater than or equal to a second threshold, move data stored in the second target physical page to the second block, wherein the second threshold is less than or equal to the first threshold.

In some examples, the memory controller is further configured to:

decide whether the reading operation for the second target physical page is single logical page read; and in response to the reading operation for the second target physical page being the single logical page read and the number of read times of the second target physical page being greater than or equal to the second threshold, move the data stored in the second target physical page to the second block.

In some examples, the number of bits of a memory cell in the second block is less than the number of bits of a memory cell in the first block.

In some examples, the first block comprises a two-level cell, a three-level cell, or a four-level cell; and the second block comprises a single-level cell.

In some examples, the memory controller is further configured to:

in response to the data moving to the second block, update a logical address to physical address mapping table.

In a second aspect, the present disclosure provides a method of operating a memory system. The memory system comprises a memory and a memory controller coupled with the memory. The memory comprises a plurality of blocks, and the block comprises a plurality of physical pages. The method comprises:

determining a sum of the numbers of read times of physical pages adjacent to a first target physical page in a first block among the plurality of blocks; and in response to the sum of the numbers of read times being greater than or equal to a first threshold, moving data stored in the first target physical page to a second block among the plurality of blocks, wherein the second block is different from the first block.

In some examples, the determining the sum of the numbers of read times of the physical pages adjacent to the first target physical page in the first block among the plurality of blocks comprises:

counting the number of read times of the physical pages adjacent to the first target physical page to determine the sum of the numbers of read times.

In some examples, the further comprises:

in response to a read request comprising a logical address, determining a physical address corresponding to the logical address, wherein the physical address comprises physical addresses of the physical pages adjacent to the first target physical page; and in response to the physical address, reading the physical pages adjacent to the first target physical page; and the counting the number of read times of the physical pages adjacent to the first target physical page comprises:

in response to reading the physical pages adjacent to the first target physical page, counting the number of read times of the physical pages adjacent to the first target physical page.

In some examples, a different first target physical page in the first block corresponds to a different first threshold.

In some examples, the method further comprises:

determining the number of read times of a second target physical page in the first block; and in response to the number of read times of the second target physical page being greater than or equal to a second threshold, moving data stored in the second target physical page to the second block, wherein the second threshold is less than or equal to the first threshold.

In some examples, the method further comprises:

judging whether the reading operation for the second target physical page is single logical page read; and in response to the number of read times of the second target physical page being greater than or equal to the second threshold, moving the data stored in the second target physical page to the second block comprises:

in response to the reading operation for the second target physical page being the single logical page read and the number of read times of the second target physical page being greater than or equal to the second threshold, moving the data stored in the second target physical page to the second block.

In some examples, the method further comprises:

determining the second threshold according to a reference threshold of the number of read times of a single physical page in the memory, wherein the second threshold is ⅕ to ⅓ of the reference threshold.

In some examples, the method further comprises:

in response to the data moving to the second block, updating a logical address to physical address mapping table.

In a third aspect, the present disclosure provides a computer-readable storage medium. The computer-readable storage medium stores executable instructions. The executable instructions, when being performed, implements the method as described in any one of the above-mentioned examples.

In a fourth aspect, the present disclosure provides an electronic apparatus, comprising the memory system as described in any one of the above-mentioned examples.

In the examples of the present disclosure, the memory controller is configured to determine the sum of the numbers of read times of the physical pages adjacent to the first target physical page in the first block, and then in response to the sum of the numbers of read times being greater than or equal to the first threshold, move the data stored in the first target physical page to the second block, wherein the second block is different from the first block. Therefore, the memory controller may reduce disturbance caused by the plurality of repeated read times of the adjacent physical pages to the first target physical page, thereby mitigating the phenomenon of threshold voltage offsets, reducing the count of error bits for reading the first target physical page, and thus improving the reliability of the memory.

It is to be understood that, references to "one example" or "an example" throughout this specification mean that features, structures, or characteristics related to the example are comprised in at least one example of the present disclosure. Therefore, "in one example" or "in an example" appearing at any place of the whole specification does not always refer to the same example. Furthermore, these features, structures, or characteristics may be incorporated in one or more examples in any suitable manner. It is to be understood that, in various examples of the present disclosure, sequence numbers of the above processes do not indicate an execution sequence, and an execution sequence of various processes shall be determined by functionalities and intrinsic logics thereof, and shall constitute no limitation on an implementation process of the examples of the present disclosure. The above sequence numbers of the examples of the present disclosure are only for description, and do not represent goodness and badness of the examples.

The above descriptions are merely preferred implementations of the present disclosure, and not intended to limit the patent scope of the present disclosure. Equivalent structure transformation made within utilizing the contents of the specification and the drawings of the present disclosure under the inventive concept of the present disclosure, or direct/indirect application to other related technical fields are both encompassed within the patent protection scope of the present disclosure.

What is claimed is:

1. A memory system, comprising:

a memory including a plurality of blocks, wherein the plurality of blocks include a plurality of physical pages; and a memory controller coupled with the memory and configured to:

determine a sum of numbers of read times of physical pages adjacent to a first target physical page in a first block among the plurality of blocks, the sum of the numbers including only the read times of the physical pages adjacent to the first target physical page in the first block; and in response to the sum of the numbers of the read times being greater than or equal to a first threshold, move data stored in the first target physical page to a second block among the plurality of blocks, wherein the second block is different from the first block.

2. The memory system of claim 1, wherein the memory controller is configured to count a number of the read times of the physical pages adjacent to the first target physical page to determine the sum of the numbers of the read times.

3. The memory system of claim 2, wherein the memory controller is configured to:

in response to a read request including a logical address, determine a physical address corresponding to the logical address, wherein the physical address includes physical addresses of the physical pages adjacent to the first target physical page; and in response to the physical address, read the physical pages adjacent to the first target physical page, and count the number of the read times of the physical pages adjacent to the first target physical page.

4. The memory system of claim 2, wherein the memory controller includes a counting circuit configured to count the number of the read times of the physical pages adjacent to the first target physical page to determine the sum of the numbers of the read times.

5. The memory system of claim 2, wherein the memory controller is configured to, within a preset time cycle, count the number of the read times of the physical pages adjacent to the first target physical page to determine the sum of the numbers of the read times.

6. The memory system of claim 1, wherein a different first target physical page in the first block corresponds to a different first threshold.

7. The memory system of claim 1, wherein the memory controller is further configured to:

determine a number of the read times of a second target physical page in the first block; and in response to the number of the read times of the second target physical page being greater than or equal to a second threshold, move the data stored in the second target physical page to the second block, wherein the second threshold is less than or equal to the first threshold.

8. The memory system of claim 7, wherein the memory controller is further configured to:

decide whether a reading operation for the second target physical page is a single logical page read; and in response to the reading operation for the second target physical page being the single logical page read and the number of the read times of the second target physical page being greater than or equal to the second threshold, move the data stored in the second target physical page to the second block.

9. The memory system of claim 1, wherein a number of bits of a memory cell in the second block is less than that in the first block.

10. The memory system of claim 1, wherein the first block includes a two-level cell, a three-level cell, or a four-level cell, and the second block includes a single-level cell.

11. The memory system of claim 1, wherein the memory controller is further configured to, in response to the data moving to the second block, update a logical address to a physical address mapping table.

12. A method of operating a memory system, wherein the memory system includes a memory and a memory controller coupled with the memory, wherein the memory includes a plurality of blocks, and the plurality of blocks includes a plurality of physical pages, and the method comprises:

determining a sum of numbers of read times of physical pages adjacent to a first target physical page in a first block among the plurality of blocks, the sum of the numbers including only the read times of the physical pages adjacent to the first target physical page in the first block; and in response to the sum of the numbers of the read times being greater than or equal to a first threshold, moving data stored in the first target physical page to a second block among the plurality of blocks, wherein the second block is different from the first block.

13. The method of claim 12, wherein the determining the sum of the numbers of the read times of the physical pages adjacent to the first target physical page in the first block among the plurality of blocks includes counting a number of the read times of the physical pages adjacent to the first target physical page to determine the sum of the numbers of the read times.

14. The method of claim 13, further including:

in response to a read request including a logical address, determining a physical address corresponding to the logical address, wherein the physical address includes physical addresses of the physical pages adjacent to the first target physical page;

in response to the physical address, reading the physical pages adjacent to the first target physical page; and the counting the number of the read times of the physical pages adjacent to the first target physical page includes, in response to reading the physical pages adjacent to the first target physical page, counting the number of the read times of the physical pages adjacent to the first target physical page.

15. The method of claim 12, wherein a different first target physical page in the first block corresponds to a different first threshold.

16. The method of claim 12, further including:

determining a number of the read times of a second target physical page in the first block; and in response to the number of the read times of the second target physical page being greater than or equal to a second threshold, moving the data stored in the second target physical page to the second block, wherein the second threshold is less than or equal to the first threshold.

17. The method of claim 16, further including:

determining whether a reading operation for the second target physical page is single logical page read; and in response to the number of the read times of the second target physical page being greater than or equal to the second threshold, moving the data stored in the second target physical page to the second block includes, in response to the reading operation for the second target physical page being the single logical page read and the number of the read times of the second target physical page being greater than or equal to the second threshold, moving the data stored in the second target physical page to the second block.

18. The method of claim 16, further including determining the second threshold according to a reference threshold of the number of the read times of a single physical page in the memory, wherein the second threshold is ⅕ to ⅓ of the reference threshold.

19. The method of claim 12, further including, in response to the data moving to the second block, updating a logical address to a physical address mapping table.

20. A computer-readable storage medium, having executable instructions stored thereon, wherein the executable instructions, when being performed by a processor, implements a method operating of a memory system, wherein the memory system comprises a memory and a memory controller coupled with the memory, wherein the memory includes a plurality of blocks, and the plurality of blocks includes a plurality of physical pages, and the method includes:

determining a sum of numbers of read times of physical pages adjacent to a first target physical page in a first block among the plurality of blocks, the sum of the numbers including only the read times of the physical pages adjacent to the first target physical page in the first block; and in response to the sum of the numbers of the read times being greater than or equal to a first threshold, moving data stored in the first target physical page to a second block among the plurality of blocks, wherein the second block is different from the first block.

* * * * *